United States Patent Office 2,741,665
Patented Apr. 10, 1956

2,741,665
CONTROL OF AN AUTOMATIC SIGNALLING SYSTEM

Roelof Maarten Marie Oberman, The Hague, Netherlands, assignor to De Staat der Nederlanden, Ten Deze Vertegenwoordigd Door de Directeur-Generaal der Posterijen, Telegrafie en Telefonie, The Hague, Netherlands Application November 12, 1952, Serial No. 319,963

Claims priority, application Netherlands November 12, 1951

28 Claims. (Cl. 179—18)

The invention relates to the control of an automatic signalling system such as in an automatic telephone or telegraph system, in which the connections in one exchange are established under the control devices which test the links between the successive selecting stages in a by-path outside these selecting stages.

Such systems are known with crossbar selectors. The Bell Laboratories Record, vol. 17, contains a number of extensive descriptions of the crossbar system developed in the Bell Telephone Laboratories which was called "No. 1 Crossbar System" later on. Out of this system the No. 5 Crossbar System has been developed. The switching stages in these systems are positioned under the control of markers, which are only provided in very small numbers and of which only one can work at a time. In order to avoid this difficulty L. M. Ericsson (Ericsson Review 1950, No. 4), as well as the Swedish Telegraph and Telephone Administration (Télé 1950, No. 2), have developed systems that are built on the old idea that group selectors and final selectors contain only markers which serve a definite selecting stage or part of it, thereby reducing the risk of large derangements caused by the breakdown of a marker.

As has been described in the Oberman copending U. S. patent application No. 316,574, there are considerable advantages in not building up the trunking diagrams of systems as those described therein according to the conventional arrangement. By the application of the invention such systems can be provided with a number of markers which work practically independently from each other and which only determine the routing of the calls through the exchange, after which such a marker seizes the control circuits individually associated with a limited group of switching devices as well as with the designated route, in order to enable these circuits to set the switches. In order to keep the effect of a contingent fault restricted to the smallest possible portion of the exchange, the switches serving a group of associated links should be combined in one control circuit, which means that, if crossbar switches are used, the nth switch or bridge of each group serving a specified group of subscribers and belonging to the same group of secondary switches in the line-link frame, should be combined in one or more crossbar switches, which is not the case in the existing systems.

The invention will be explained in connection with a number of diagrams, which only represent the circuit arrangements in so far as is necessary for the understanding thereof.

Figs. 2 and 2a show an improvement of the trunking diagram according to Figs. 1 and 1a;

Fig. 5 shows the principle of the markers and of the switch control devices as required in the trunking diagram according to Figs. 2 and 2a;

Figure 1:
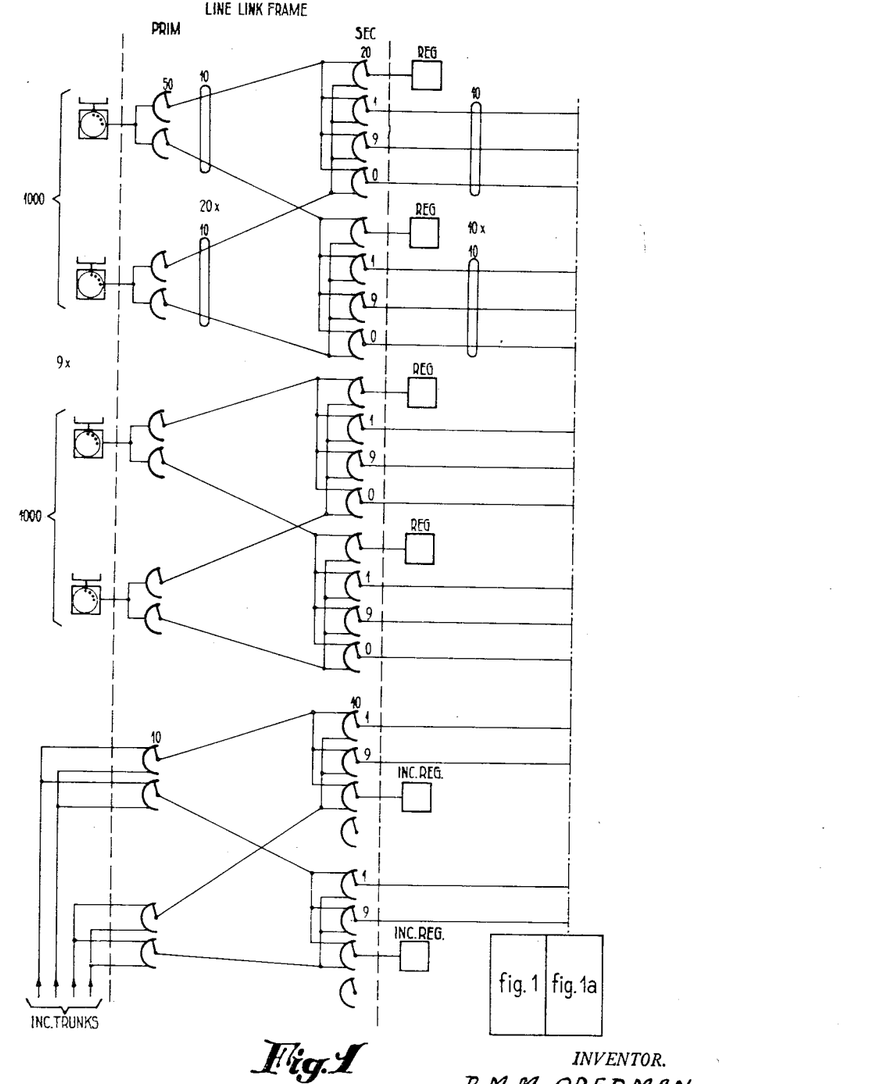
Figs. 1 and 1a show the principle of a trunking diagram for a four-digit system.
Figure 1A:
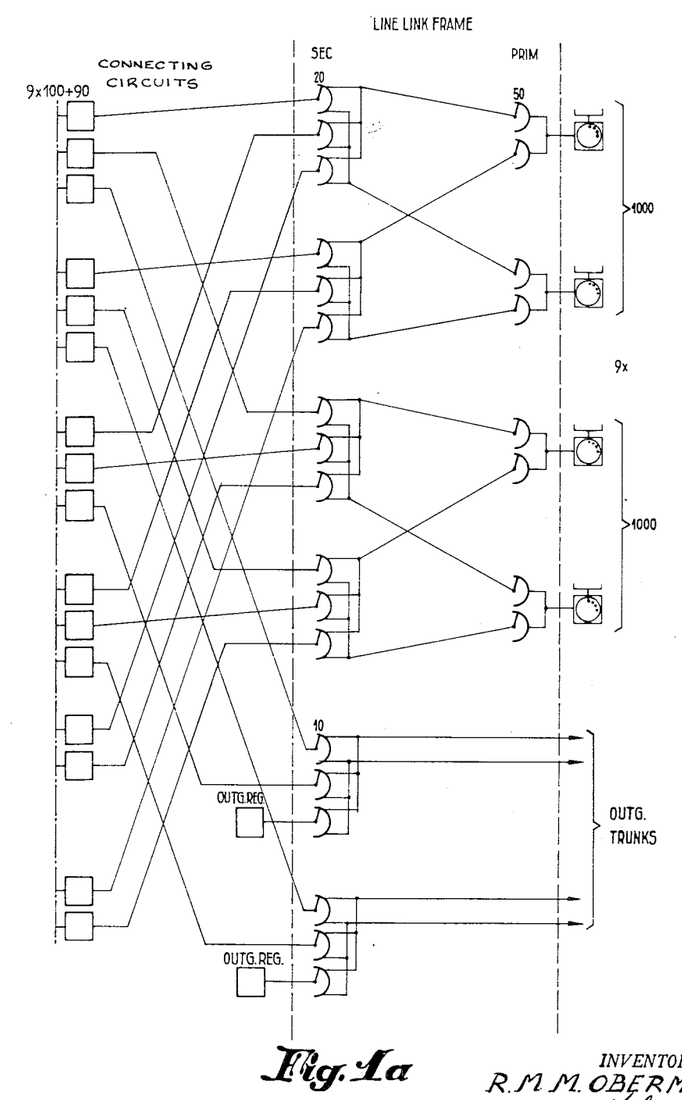

The diagram of Figs. 1 and 1a is given as a first example and only illustrates the general principle. It is a general trunking diagram of an exchange comprising a maximum of 9000 numbers in a four-digit system having an outlet via the "0." The diagram is only built up of line-link frames. The primary switches all consist e. g. of 50 vertical units having ten outlets, as is the case with the crossbar switch of the American type. With these switches a decimal system can be obtained. The fifty subscribers connected to each of them have 10 outlets for the outgoing and incoming traffic together ($p$ (blocking probability)=0.01, 3.1 T. U. (traffic units)), which in most cases seems amply sufficient. Twenty of these groups of 50 subscribers are systematically distributed over a group of secondary switches of the line-link frame, which groups of secondary switches is divided into two parts, one for the outgoing and the other for the incoming traffic of the subscribers' lines. For each group of 1000 subscribers there are 10 groups of secondary switches, each group containing 10 switches for outgoing and 10 for incoming traffic. Each switch has 20 outlets, thus occupying 2 vertical units of an American crossbar switch.

There are 9 of these groups of 1000 subscribers, a 10th link-frame being destined to trunk lines outgoing and incoming via "0." So each group of 1000 subscribers disposes of 100 connecting circuits. The group of incoming lines also corresponds with a group of a maximum of 100 connecting circuits. The outgoing terminals of these circuits are distributed by additional links, namely said connecting circuits regularly over the inlets of the secondary incoming switches of the line-link-frame. Each group of these incoming secondary switches of the line-link-frame has been through connected to a group of secondary switches handling the outgoing traffic. The connecting line links shown in Fig. 1 between the incoming secondary switches and the primary switches of this frame are the same as those shown in Fig. 1a between the primary switches and the outgoing secondary switches i. e. the line link frame in Fig. 1 is the same frame as the line link frame in Fig. 1a.

The regular distribution of the right hand terminals of the connecting circuits over the incoming secondary switches implies that in each group of ten connecting circuits each circuit is connected to a different group of switches having access to a certain thousand, so that of the 100 connecting circuits destined to each thousand, ten are connected to the incoming switches of each other thousand.

So the situation on the secondary switches of a line-link-frame is as follows: On one side 20 groups of 10 links are connected to the primary switches PRIM, and on the other side these primary selectors are connected to the outgoing and the incoming terminals of the connecting circuits, which in their turns are subdivided into 2×10 groups, each comprising 10 connecting circuits.

In principle the functioning of the system according to Figs. 1 and 1a is as follows. A calling subscriber is connected to a sender or register REG, ten of which have e. g. been provided per 1000 subscribers, one for each group of 10×10 or 100. If desired this number may be taken higher or lower. The senders are connected to the secondary switches SEC of the line-link-frame. If required further concentration stages may be inserted.

After the four digits of the required subscriber's number have been dialled, a marker, not shown in Figs. 1 and 1a (See Figs. 5 or 6 and 6a), is seized, which seizes three free and mutually connectable links, and completes the required call, i. e. links between it and the calling, the called and their connecting circuits.

Each subscriber can always be connected to any other subscriber via 10 different routes. In this manner an automatic exchange arranged according to the trunking diagram of Figs. 1 and 1a would have to be equipped with 900 connecting circuits plus a maximum of e. g. 90 incoming connecting or trunk circuits, whereas, if the connecting circuits could be considered as a full availability group, only about 400 would be required for the traffic considered.

Consequently, for an exchange of 10,000 subscribers equipped with crossbar switches the trunking diagram of Figs. 1 and 1a requires a minimum quantity of switching apparatus at the price of relatively large number of connecting circuits, which presents the question whether it would not be possible to reduce the number of connecting circuits.

Before going into this question, attention should be drawn to the fact that in the diagram of Figs. 1 and 1a a numerical selection is actually already made before the connection of the circuit, i. e. by the selection of the secondary concentration switch and the connecting circuit over which the connection will be established.

It is possible to reduce the number of connecting circuits by combining the connecting circuits into larger groups, so that the smaller splitting up in consequence of the numerical division of the connecting circuits will result in larger groups.

Figure 2:
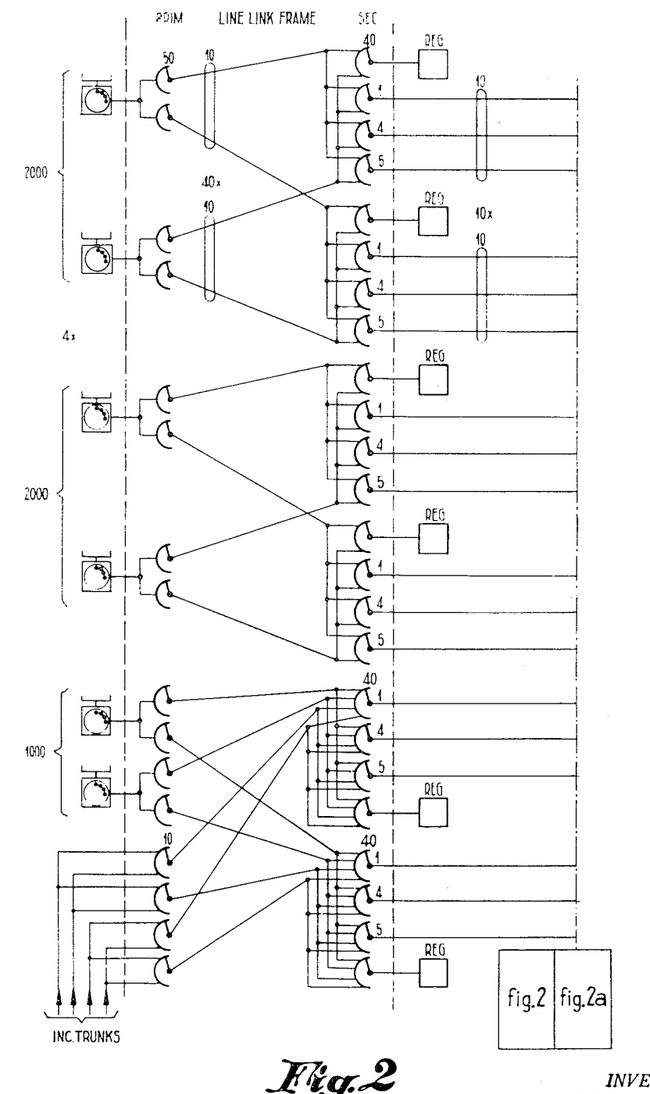
Figure 2A:
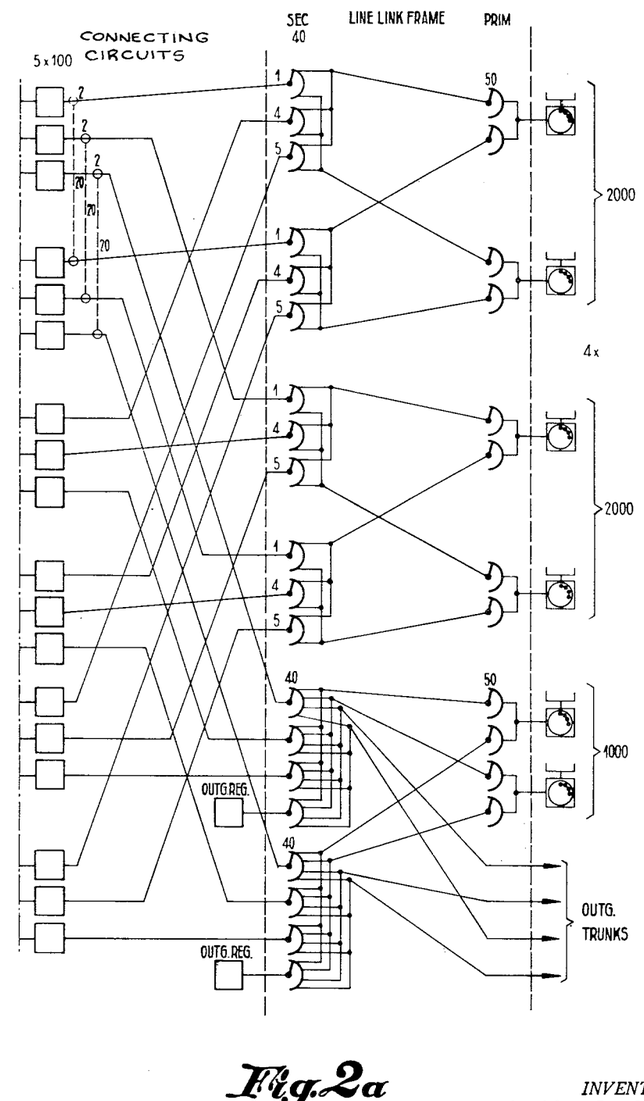

In principle it is possible to combine two 1000-groups into one 2000-group. Then the secondary switches in the line-link frame will have 40 positions, and there will be 4½ such groups of 2000 subscribers. Furthermore each group of 200 subscribers has 40 groups of 10 connecting links, which in view of the division in tens would have to correspond with 2×5 groups of 20 connecting circuits (Figs. 2 and 2a). If again the traffic with 50 subscribers, which is handled over the 10 links, is taken to be 3 T. U. ($p=0.001$), a group of 2000 subscribers will supply about 120 T. U., which must also be handled by the 2×5 groups of connecting circuits, which, with a somewhat reduced grade of service or increased blocking chance, is possible and admissible.

A division of the exchange into 4 groups of 2500, inclusive of the group of the "0" traffic, would split up the connecting circuits into 2×4 groups. Each group of 2500 subscribers supplies a traffic of about 150 T. U., and then each group of connecting circuits must contain about 30 circuits.

With this division, the secondary switches as well as the primary switches of the line-link frame will have 50 positions.

It should be remarked that if a heavy outgoing traffic over the "0" numbered switches and connections must be expected, it is without further measures possible to increase the number of connecting circuits leading up to the switches which have access to the outgoing lines, to e. g. 40 or more. It seems that the trunking diagram of Figs. 2 and 2a with the numbers contained in it gives a reasonable decrease of the number of connecting circuits (i. e. a decrease of about half), without the required switching material being inadmissibly increased.

Figs. 3, 3a, 3b and 3c show a trunking diagram for a six-digit system. This system must e. g. serve a complete mesh-shaped network between a number of exchanges with heavy traffic, to which other exchanges at the outskirts of this big town network have been connected in a starlike manner. The first digit indicates the star group, the second digit determines the exchange, while the other four digits determine the number in the relevant ten-thousand-unit in that exchange.

So the exchange in the starcentre has incoming lines and outgoing lines on 2 levels, i. e. those from and to other star-group centres and those from and to the associated satellite exchanges of the local starcentre. The traffic from the satellite exchanges can be handled wholly or partially via a tandem exchange of the star-group centre. Figs. 3, 3a, 3b and 3c show an example of the manner in which such a star-group centre might be built up in accordance with the ideas developed above. This example is based on the fundamental form having 50-point primary (PRIM) and 40-point secondary (SEC) switches in the line-link frame, as is indicated in Figs. 2 and 2a. The subscribers have been divided into 5 two-thousand groups each disposing of e. g. 100 connecting circuits.

The connecting circuits are divided into three groups in accordance with the main routes of the traffic, i. e. (1) the group of the local or internal 10,000-unit, (2) the group destined to the other 10,000-units or satellite or minor exchanges of the same star-group, and (3) the group destined to the other star-group centres or exchanges outside the local star-group centre of (1). Such a division of the connecting circuits in three groups, viz. one smaller group for the internal traffic of the local ten-thousand unit, one for the traffic of this ten thousand unit with other star group centres, or other minor exchanges, and one for the traffic of the ten thousand units with other, dependent or satellite ten thousand units belonging to the same star group centre or minor exchange, is admissible from the point of view of traffic technique. The outgoing terminals of the connecting circuit are connected to a switching stage (trunk-link frame I having only secondary switches), which can give through connection to the required 2000 group, of which only one frame I has been shown in the example in Fig. 3a. The incoming switches and the outgoing switches of the line-link frame of each 2000 have been multipled in corresponding groups. The two groups of connecting circuits which lead to the outgoing trunks, both to the higher switching level (other star group centres or minor exchanges) and to the lower switching level (satellite or dependent exchanges of the local star group) are also led via secondary switches of a trunk-link frame II (see Fig. 3a), in which the outgoing traffic is distributed over routes to $n$ other star-group centres and $m$ associated satellite exchanges. By way of example 200 outgoing lines have been provided in total for both switching levels, which lines can be reached from the local ten thousand unit.

In principle it is not necessary to discriminate as to the origin of the incoming lines. As a matter of fact an incoming line from another group centre may have traffic for the local exchange associated with the group centre, but this traffic may also be destined for the satellite exchanges of this group centre. Then this traffic is tandem or through traffic to the lower level. It can, however, also be necessary to apply an indirect or a tandem routing on the level of the group centre. So there must also be a possibility to put through an incoming connection from an exchange of said group to an outgoing trunk to such an exchange.

It must also be possible to connect through the trunks coming in from the satellite exchanges with the three main possibilities described before. To this end the switching diagram of Figs. 3b and 3c offers the following possibilities. Each incoming trunk (in the example 2×400 lines) is connected e. g. to an arc of a 20-point switch, twenty of which are multipled together. Twenty of these groups of primary switches PRIM of the incoming trunk-link frame are connected to secondary switches SEC having an equal number of positions, together giving access to 400 outlets, in a conventional manner known.

Figure 3:
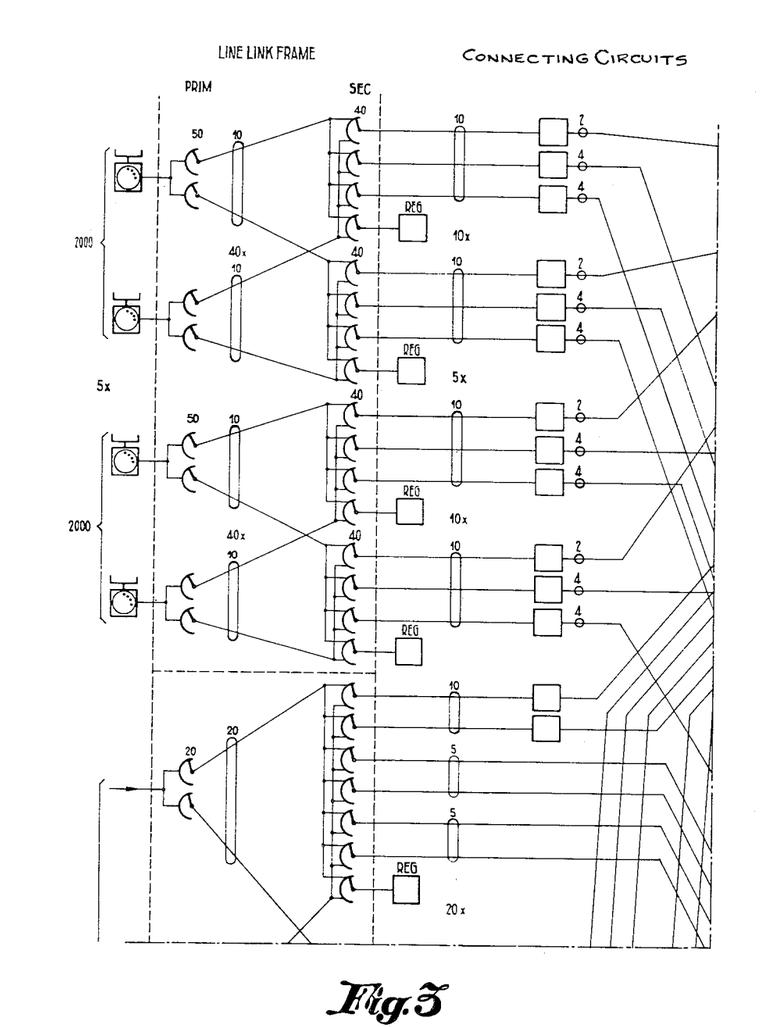
Figs. 3, 3a, 3b and 3c show an example of the trunking diagram of an exchange in a six-digit system.
Figure 3A:
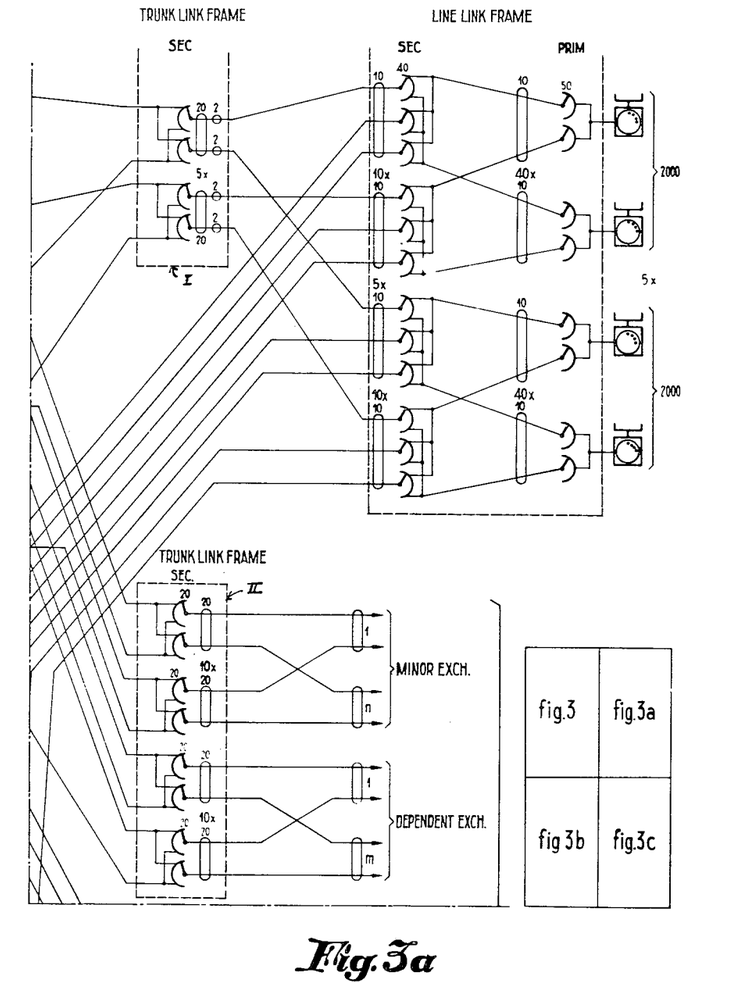
Figure 3B:
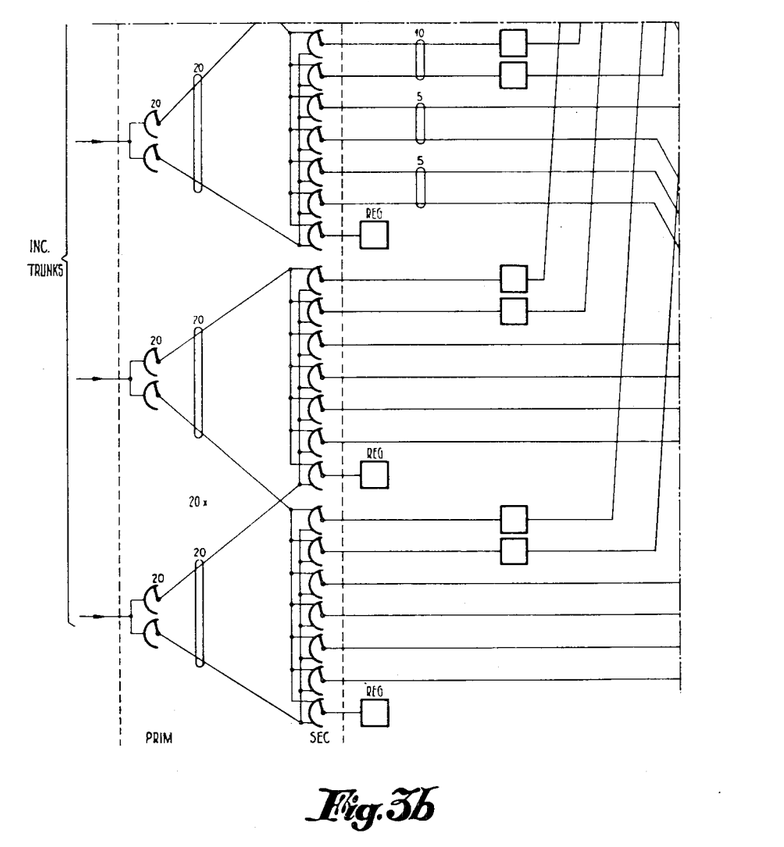
Figure 3C:
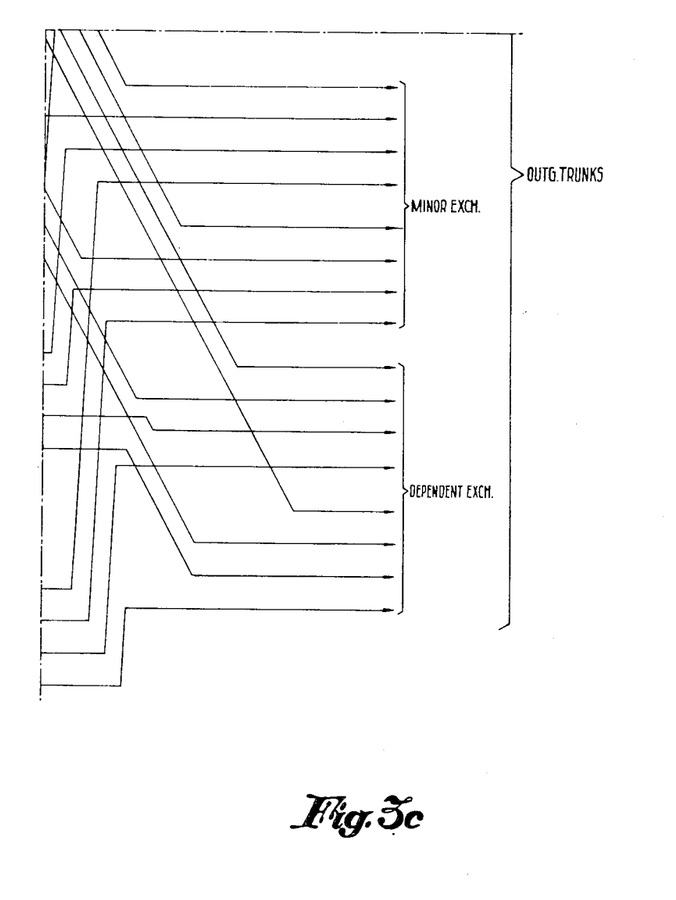

On these secondary switches SEC the traffic is distributed over 5 local 2000-groups (Fig. 3a) and the various group centres or minor exchanges and satellite or dependent exchanges (Fig. 3b). If the number of each of these groups is not too large (5 to 6), it is not necessary to provide a following switching stage. Apparently it is recommendable not to couple the outgoing (or transit) lines of the tandem exchange with the outgoing lines of the local exchange. In doing so markers can be used more or less freely, using separate markers for local originating traffic and for through traffic.

If the star- or group centre contains more than two or three local 10,000-units, it may be necessary to insert a half link-frame such as frame I or II in Fig. 3a comprising only secondary switches, between the secondary switches of the trunk-link frame of the incoming lines.

Figure 4:
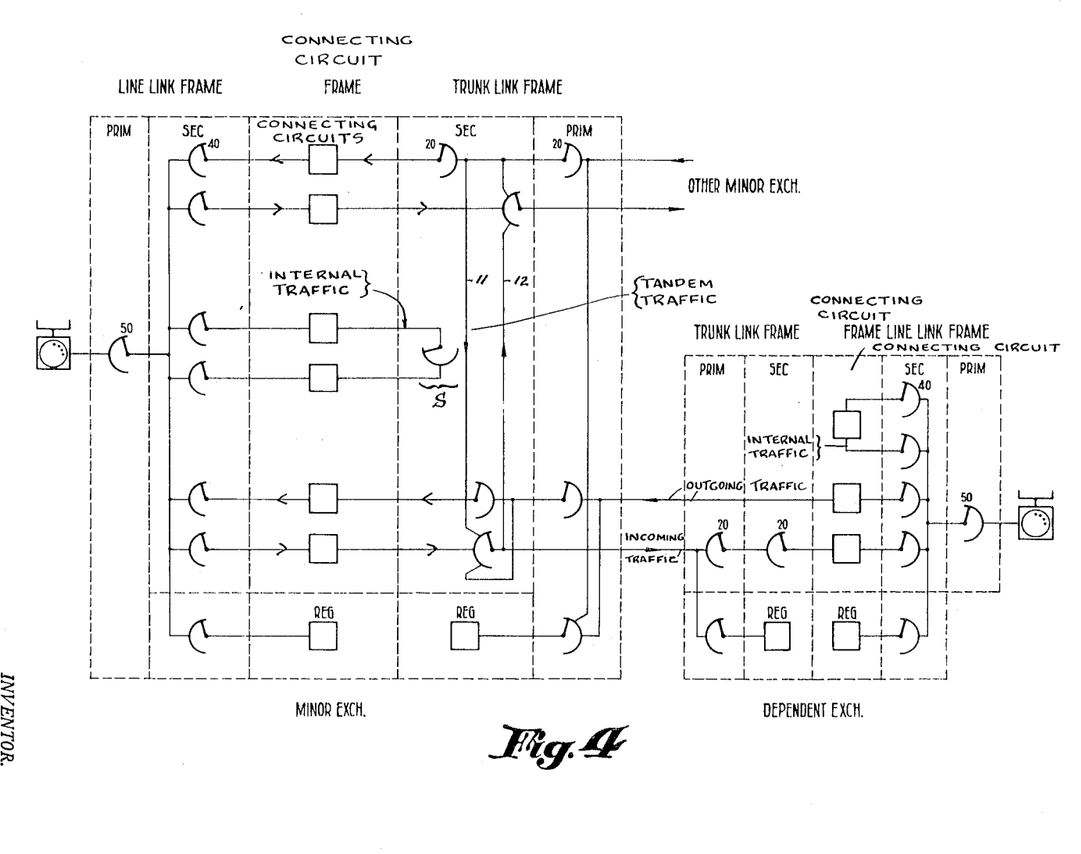
Fig. 4 shows the correlation between the arrangements according to Figs. 2 and 3.

Fig. 4 symbolically shows the trunking diagram of a group centre or minor exchanges with a dependent or satellite exchange connected to it. The trunking diagram of Figs. 2 and 2a (omitting the switch between the outgoing side of the connecting circuit and the outgoing lines) has been represented together with the diagram of Figs. 3, 3a, 3b and 3c symbolically in Fig. 4. The satellite or dependent exchange has internal traffic via a line-link frame consisting of primary and secondary switches. The outgoing traffic passes only one link-frame, which is admissible with heavy traffic in the direction of the minor exchange or star-group centre, which as a rule is the case in such an exchange.

With the given switches the incoming traffic must be handled via two trunk link-frames each comprising a primary and a secondary switching stage. Registers can be connected in the usual manner.

For the internal traffic the star-group centre or minor exchange contains one switching more than the satellite or dependent exchange, i. e. secondary switching stage S in the trunk-link frame. For reasons of uniformity (i. e. in view of the incoming and the outgoing lines) the connecting circuit in this figure has been split up into two half connecting circuits. At the top of Fig. 4 the functions with other group centres or minor exchanges have been shown, at the bottom of the figure those with the indicated and other satellite or dependent exchanges, if any. They always contain an incoming or an outgoing half of a connecting circuit.

The registers can again be connected on in the usual manner.

The connections 11 and 12 which have a vertical course in the secondary trunk-link frame indicate the traffic that is handled in tandem, i. e. traffic originating from satellite exchanges and group centres which is destined for other satellite or dependent exchanges or group centres or minor exchanges.

Figure 5:
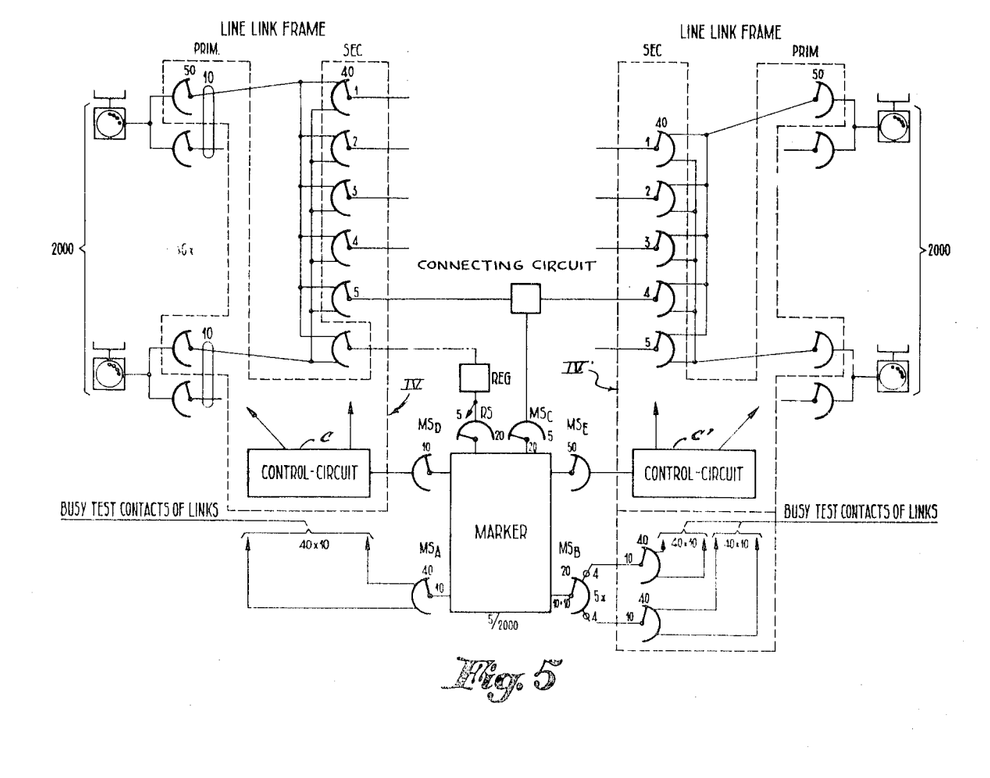

Fig. 5 shows the principle of the positioning of the crossbar switches in a system according to the trunking diagram of Figs. 2 and 2a.

Fig. 5 shows a number of bridges of crossbar switches in the primary and secondary stages of the line-link frame. Between the primary and secondary switches of the line-link frame of a group of 2000 subscribers there are 400 links which in 10 groups of 40 go to 10 groups of e. g. 10 secondary switches SEC for the outgoing traffic, and 10 groups of e. g. 10 secondary switches for the incoming traffic. For each of the 10 groups of secondary switches (bridges) which have been assembled in a number of crossbar switches, a control circuit C has been provided. So per 2000 subscribers with 100 connecting circuits there are 10 control circuits C. The primary switches PRIM belonging to this group of 2000 subscribers can likewise be subdivided into 10 groups, each of which co-operates with a certain group of secondary switches which are served by one control circuit C. This certain group IV or IV' has been outlined in Fig. 5 with a dashed line around a control circuit C and its corresponding switches of the primary and secondary part of the subscriber's line-link frame. Each group of primary switches is operated by means of the same control circuit C as the co-operating group of secondary switches.

This means that if such a control circuit C breaks down, only one tenth of the traffic of a group of 2000 subscribers is affected, because one control circuit is provided for each corresponding n multiple of links multipled over all of the link groups, i. e. the first links of each group are multiplied to one control circuit C, the second to another control circuit, etc.

A calling subscriber gets access to a sender or register REG in a manner as usual in the crossbar systems. As this operation is in no way connected with the invention it need not be described further here. The sender (REG) sends dialling tone to the calling subscriber, who dials the four digits, after which the positioning of the required connection is started. E. g. for a group of 2000 subscribers a maximum of 20 senders is provided, which in their turn dispose of a maximum of 5 markers of a simple construction (see Carpenter U. S. Patent No. 2,093,117, issued September 14, 1937). So when a sender has received the four digits, it seizes a free marker, to which the whole number of the subscriber to be called, as well as the number of the calling subscriber (which is communicated to the sender in the manner usual for crossbar systems) is transmitted.

The switch $MS_A$ belonging individually to a marker and preferably consisting of a number of bridges of a crossbar switch, has 40 positions and 10 wipers by means of which access can be had to the engaged indications of all the links between the primary switches and the secondary switches of the line-link frame belonging to the relevant group of 2000 subscribers. Under the control of the called subscriber's number, the switch $MS_A$ is set into that position in which the 10 engaged indications of the links serving the group of 50 subscribers in which the calling subscriber occurs, are connected to the marker. At the same time the switch $MS_B$ which can also be a part of a crossbar switch and which has e. g. 5×5 positions (5 positions corresponding with each group of 2000 subscribers), is positioned under the control of the called subscriber's number. Each of the 5 positions of this switch $MS_B$ belonging to one group, gives access to a switch, such as $MS_A$, giving access to the engaged indications of all the links between the primary and the secondary switches of the 2000 unit. So 5 different markers out of the whole group of markers can survey the engaged position of the links in a 2000 unit. The group of 10 connecting links via which the connection can be set up, are connected to the marker. Furthermore a connection is established via switch $MS_C$ between the marker and the engaged indications of the connecting circuits. This switch has 5 positions and 20 wipers. The fact is that there is always a group of 20 connecting circuits via which the required connection can be set up. The marker makes a selection among the three groups of 10 (incoming links), 20 (connecting circuits), and 10 (outgoing links) possibilities of making the connection respectively. As a matter of fact this selection is restricted to three free links, which are mutually reachable or available.

Provided the suitable switching means are used, such a selection can be made by a number of markers simultaneously in the same groups of links. The engaged indications of the links between the primary and secondary switches can be so arranged that only those can be selected in which the corresponding control circuit C is free, and that the seizure of a link implies the seizure of this control circuit. Such a switching method is known from the normal automatic switching systems such as e. g. the Antwerp, Belgium Bell Telephone 7 D Rotary system.

In principle the device for selecting together the route through the exchange, to which route consists of three links, is the same as the one indicated in the above mentioned description of the No. 1 Crossbar System, so this device will not be described further. The testing device in the marker for testing groups of links and taking the free *n*th one from each group, shows which of the 10, 20, 10 connecting links, respectively, are seized or will be used for the connection to be set up. The marker sets the switch MS$_D$ in the position corresponding with the control circuit C belonging to the switches of the line-link frame that correspond with the selected link. Furthermore the switch MS$_E$ is positioned on the control circuit C' of the selected two-thousand group, which controls the switches that operate the selected link. The control circuits C and C' can be connected without further measures because by the selection of the links they had already been safeguarded from being seized by other markers.

Next the marker gives on the calling and the called sides, respectively, the required control information to the primary and secondary switches of the line-link frame. From the control circuit and the positioned selecting stages the marker can be connected to the line of the subscriber to be called to make the free test, if it had not already been effected via paths outside the selecting stages, as is the case in the No. 1 Crossbar System.

If the called subscriber is engaged, busy tone is given, e. g. via the cord, to the calling subscriber. It is, without further measure also possible to release the connection at the calling subscriber's line circuit and to send him busy tone from that circuit. If the called subscriber is free, the speech path is switched through via the connecting circuit, ringing tone being sent to the subscriber to be called.

If many wires are available between marker and control circuit, the control circuits need in principle only contain the magnets of the crossbar switches to be operated. This number of wires can be restricted appreciably by the use of some relays in the control circuits C and C', such as shown in Oberman copending application Serial No. 316,573, filed October 24, 1952.

The switching structure designed is not yet complete because the subscribers' numbers disposing of more than one line cannot be dealt with in this manner. The fact is that the access to the next line of such a subscriber's number, which preferably must be established in another 50 in view of the distribution of the traffic (particularly if no non-decimal system combined with conversion is applied, as has been designed in the crossbar systems of the Western Electric Co.), may have to be gained via quite another route through the exchange, therefore it will not be sufficient to operate switches in the speech route repeatedly.

It will therefore be necessary to add a device such as shown in the above mentioned Carpenter patent or in Oberman's copending application Serial No. 230,277, filed June 7, 1951, to the marker for testing auxiliary lines, so that the marker before positioning a connection ascertains which line will be taken. To maintain the simplicity of the system and in view of the space available in the crossbar switches, it will be assumed that 20% of the available numbering capacity can be adapted to group-numbers.

Figure 6:
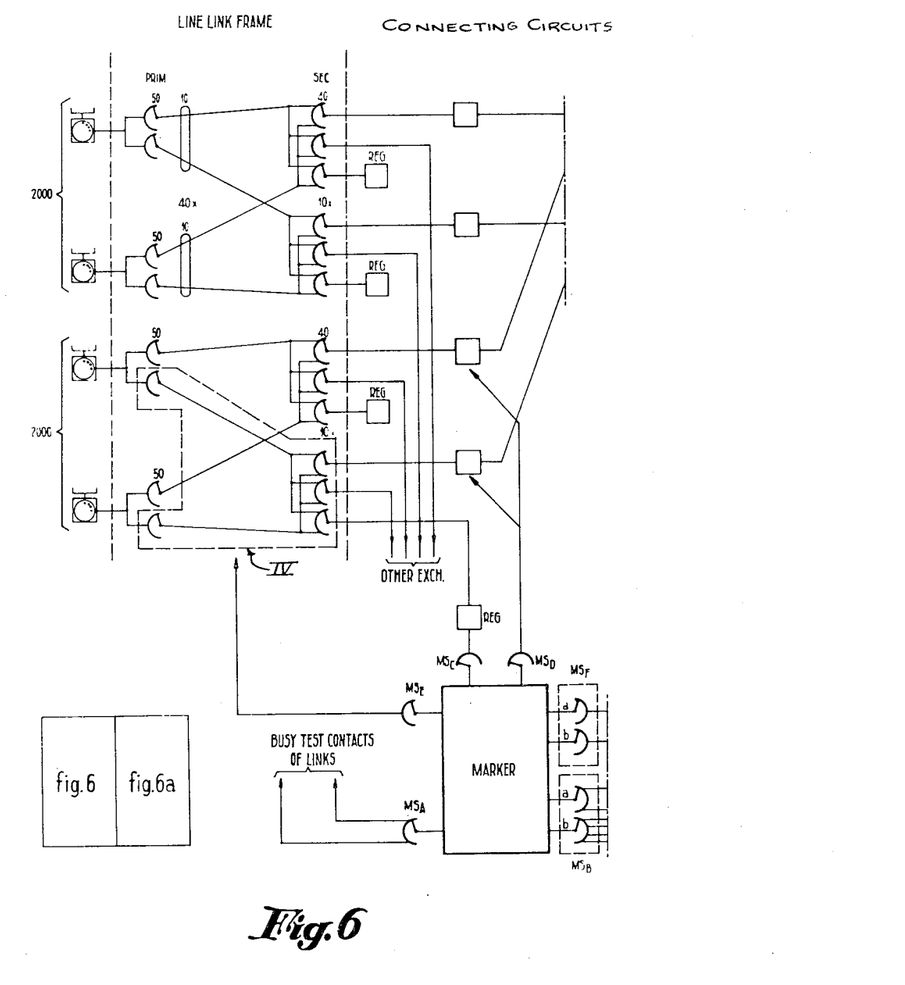
Figs. 6 and 6a show a diagram similar to Fig. 5 for a 5 or 6 digit system.
Figure 6A:
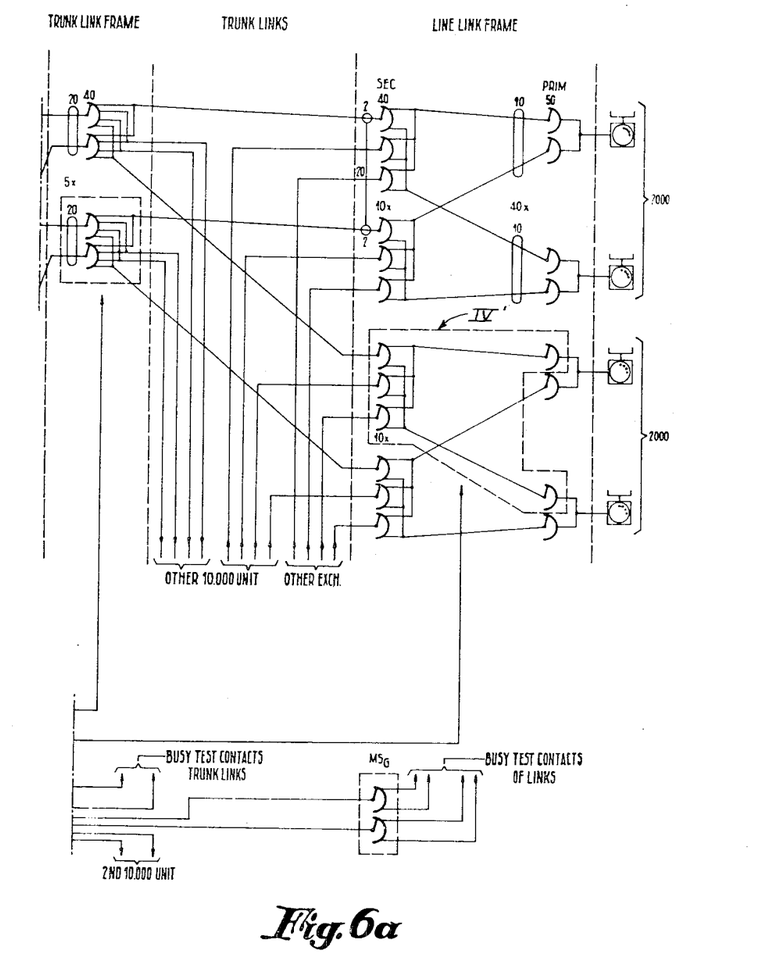

Figs. 6 and 6*a* show by way of example the trunking diagram of an exchange for 2000 lines with a diagrammatic view of the coupling of a sender REG and a marker with the different switching stages. Figs. 6 and 6*a* are an elaboration of Fig. 5 also representing an independent exchange with 10,000 lines. The trunking diagram of Figs. 6 and 6*a* has a trunk-link frame for the traffic to the two ten-thousand units. Such a frame, however, is not strictly necessary. To indicate that the applied symbols representing selectors or finders can always be interchanged in systems with crossbar switches, the switches of the trunk-link frame in Fig. 6*a* have been drawn as selectors enclosed in the dashed line rectangles between parallel vertical dashed lines outlining the frame itself, in contradistinction to those of the trunk-link frame in the local part of the switching diagram of Fig. 3*a*.

The marker can test by means of the switch MS$_A$ the engaged conditions of all the links which the calling subscriber has at his disposal, the link via which the connection with the called subscriber will be established being tested via the switch MS$_B$ (arc *b*) and one of the switches MS$_G$. The connecting circuits via which the connection will be set up and the one of the trunk links are tested via the switches MS$_D$ and MS$_B$ (arc *a*), respectively. Now the marker must select together four successive free and mutually reachable links. Via the switch MS$_E$ the positioning information is given to the control circuit operating the switches in the line-link frame via which go the designated links. Via MS$_F$, arcs *a* and *b*, the information regarding the designated trunk-link and the required positioning of the line-link frame for the subscriber to be called is transmitted to the relevent control circuits. In Figs. 6 and 6*a* the crossbar switch bridges allotted to one control circuit have been surrounded with a dashed line IV or IV'.

While I have illustrated and described what I regard to be the preferred embodiment of my invention, nevertheless it will be understood that such is merely exemplary and that numerous modifications and rearrangements may be made therein without departing from the essence of the invention, I claim:

1. In an automatic switching system between a plurality of terminals wherein any one or calling terminal can be connected to any other or called terminal in the system, said system having at least two incoming and two outgoing selecting stages, incoming link circuits between said incoming stages, outgoing link circuits between said outgoing stages, connecting circuits between said incoming and said outgoing stages, and senders associated with said incoming stages; the improvement comprising: a plurality of markers, means for connecting a sender to a calling terminal, means for connecting said sender to a marker, means controlled by said marker for selecting a free incoming link circuit, a free outgoing link circuit and a mutually available free connecting circuit between said free link circuits all of which three circuits are connectable in series between said calling and said called terminals, control circuits connected with said link circuits, means for connecting a said control circuit connected with each said free link circuit to said marker, and means controlled by said control circuits and said marker for setting up the connection simultaneously through said selected link and connecting circuits between said calling and said called terminals.

2. A system according to claim 1 wherein said terminals are connected to subscribers' sets in an electrical communication system network.

3. A system according to claim 1 including means for reserving said control circuits connected with said selected free link circuits until they are connected to said marker.

4. A system according to claim 1 wherein said means for setting up said connection sets it up simultaneously through said selected link and connecting circuits.

5. A system according to claim 1 including means for connecting said marker to said called terminal to test the free condition of said terminal.

6. A system according to claim 1 wherein said means for selecting said free link and connecting circuits includes a by-path circuit through said system separate from said connection through said selected free link and connecting circuits.

7. A system according to claim 1 wherein said selecting stages are composed of groups of selector switches.

8. A system according to claim 7 wherein said selector switches are crossbar switches.

9. A system according to claim 7 wherein said means for setting up said connection includes means for positioning said selector switches connected to said selected link and connecting circuits.

10. In an automatic switching system between a plurality of subscribers' terminals wherein any one subscriber's terminal can be connected to any other subscriber's terminal in the system, said terminals each having a corresponding call signal whereby a calling subscriber can automatically be connected to a called subscriber by transmitting the call signal corresponding to said called subscriber to said system, said system having at least two incoming and two outgoing selecting stages of groups of selector switches, first groups of link circuits between the selector switches of said incoming selecting stages, second groups of link circuits between the selector switches of said outgoing selecting stages, connecting circuits between the selector switches of said incoming and outgoing stages, and senders associated with said incoming stages; the improvement comprising: a plurality of markers connectable to any of said link and connecting circuits and senders, means for connecting a sender seized by a calling subscriber's terminal to a free marker, means controlled by said marker for connecting said marker to a free link circuit of said first groups, a free second link circuit of said second groups and a mutually available free cord circuit between said free link circuits, all of which free circuits are connectable in series between said calling and said called subscribers' terminals, control circuits connected with groups of said link circuits, means for reserving a free control circuit connected with each said selected link circuit, means for connecting said reserved control circuits to said marker, means controlled by said control circuits for simultaneously positioning the selector switches connected to said selected link and connecting circuits for setting up the connection through said link and connecting circuits between said calling and said called subscribers' terminals.

11. In an automatic electrical switching system between a plurality of subscribers' terminals wherein any one subscriber's terminal can be connected to any other subscriber's terminal in the system, said terminals each having a corresponding call signal whereby a calling subscriber can automatically be connected to a called subscriber by transmitting the call signal corresponding to said called subscriber to said system, said system having at least two incoming and two outgoing selecting stages of groups of selector switches, incoming link circuits between the selector switches of said incoming selecting stages, outgoing link circuits between the selector switches of said outgoing selecting stages, connecting circuits between the selector switches of said incoming and outgoing stages, and senders connectable with said incoming stages; the improvement comprising: a plurality of markers connectable to any of said link and connecting circuits and senders, means for connecting a sender seized by a calling subscriber's terminal to a free marker, means for transmitting the called terminal's signals to said sender and then to said free marker to control said marker, separate by-path means controlled by said marker for simultaneously connecting said marker to a free incoming link circuit, a free outgoing link circuit and a mutually available free connecting circuit between said free link circuits, all of which free circuits are connectable in series between said calling and said called subscribers' terminals, control circuits connected with said link circuits, means for reserving and busying a free control circuit connected with each said selected link circuit, means for connecting said reserved control circuits to said marker, means controlled by said control circuits and said marker simultaneously positioning the selector switches connected to said selected link and connecting circuits for setting up the connection between said calling and said called subscribers' terminals, and means for connecting said marker to said called terminal to test its free condition.

12. In an automatic switching system for a plurality of subscribers where any one subscriber can be connected to any other subscriber in the system, said system comprising: a subscriber's link frame having at least a primary selecting stage of selector switches and a secondary selecting stage having incoming and outgoing selector switches, connecting circuits between said incoming and outgoing secondary selecting stage switches, incoming and outgoing link circuits between said primary and secondary stage switches, first means for directly connecting the subscribers to said primary stage switches, one of a plurality of markers connected to each of said incoming and outgoing links and connecting circuits for determining which incoming link, outgoing link and connecting circuit are free and connectable in series between a desired calling and called subscriber, separate control circuits for said incoming and outgoing links for positioning the switches of said stages, and means responsive to said first means for selecting separate corresponding control circuits for the free incoming and outgoing link circuits to position simultaneously the switches of the stages connected to said free links and connecting circuit which are connectable in series between said calling and said called subscribers.

13. In an automatic switching system between a plurality of subscriber's lines, any one of which can be connected to any other subscriber's line in the system, said system including a primary and a secondary switching stage, each of which stages has a plurality of multi-contact switches, the improvement comprising: line groups into which said subscriber's lines are arranged, distinct groups of a plurality of multipled switches in each switching stage of each line group, each subscriber's line being multipled to the switches in one group of said primary switching stage, and cross-bar switches connected to form another groups comprising the multipled switches of said secondary switching stage and one of the switches of each of the groups in said primary switching stage, whereby each subscriber's line is connectable to a plurality of said cross-bar switches.

14. A system according to claim 13 including a control circuit for each of said cross-bar switches in said other group connecting the multipled switches of each group in said secondary switching stage with a multipled switch from each group in said primary switching stage.

15. A system according to claim 14 including a plurality of marker circuits for each line group, finder switches for connecting said marker circuits to each group, and other finder switches for connecting said marker circuits to said control circuits, whereby all of the switching stages between two given subscriber's lines may be set-up simultaneously under the control of said marker and control circuits.

16. A system according to claim 15 including busy test contact connections between said switching stages and said marker circuits.

17. A system according to claim 13 having finding and selecting primary and secondary switching stages.

18. A system according to claim 17 including a plurality of senders connectible to each group of said finding secondary switching stage.

19. A system according to claim 17 including connecting circuits connectible between the finding switching stages to the selecting switching stages.

20. An automatic switching system having a plurality of terminals any one of which can be connected to any other thereof, said system comprising: primary and secondary finding and selecting switching stages between any two of said terminals, a plurality of multi-contact switches in each stage, said terminals being arranged in terminal groups and said multi-contact switches being multipled into groups associated with each said terminal group, means for connecting each said secondary stage group of a given terminal group to a multi-control switch from each said primary stage group of the same given terminal group to form a connected group of switches, separate control circuits connected to each finding and to each selecting connected group of switches, a register connectable to each said connected group of switches, and a marker circuit connectable to said finding and said selecting control circuits by means of which control circuits the establishment of a connection between two terminals may be set up outside said switching stages, whereby each terminal has available more than one connection to reach a free register and a free marker circuit.

21. An automatic telephone switching system according to claim 20 wherein each said terminal is connected to a telephone set.

22. A system according to claim 20 wherein each said connected group of switches comprises a cross-bar type of switch having both primary and secondary switching stage sections.

23. An automatic switching system having a plurality of subscribers each having a subscriber's set, any one or calling subscriber of which can be connected to any other or called subscriber through an exchange, said system comprising: primary and secondary finding and selecting switching stages between a calling and called subscriber's set, a plurality of multi-contact switches in each said stage, said subscriber's set being divided into first groups, said multi-contact switches in each primary switching stage being multipled into second groups of switches within each said first group, said multi-contact switches in each secondary switching stage being multipled into third groups of switches, said multipled switches in each said third group being connected to one switch in each said second group within the corresponding first group to form a fourth group of interconnected switches, separate control circuits connected to each said fourth group of interconnected switches in both said finding and said selecting stages, a plurality of senders each being connectable to a said fourth group of connected switches in said finding stages of each said first group, and a plurality of marker circuits each being connectable to both a said finding and a said selecting control circuit by means of which the establishment of a connection between a calling and a called subscriber's set may be set up outside said switching stages for selecting simultaneously free and available finding and selecting stage switches for connecting said subscribers.

24. A system according to claim 23 wherein said marker circuits include means for busy testing said second and third groups of switches of both said finding and said selecting switching stages.

25. A system according to claim 23 wherein each said fourth group of interconnected switches comprises cross-bar type of switches in both primary and secondary switching stage sections.

26. A system according to claim 23 including marker finder switches connected with each marker circuit for connecting said marker circuits to their corresponding control circuits.

27. A system according to claim 23 wherein said third group of switches of said finding and said selecting stages are interconnected by means of connecting circuits.

28. A system according to claim 27 including marker finder switches connected with each marker circuit for connecting said marker circuits to said connecting circuits.

References Cited in the file of this patent
UNITED STATES PATENTS

| | | |
|---|---|---|
| 2,412,258 | Gillings et al. | Dec. 10, 1946 |
| 2,582,959 | Bruce et al. | Jan. 22, 1952 |
| 2,583,848 | Johnson | Jan. 29, 1952 |
| 2,598,412 | Modee et al. | May 27, 1952 |
| 2,631,195 | Ostline | Mar. 10, 1953 |